United States Patent

[11] 3,553,522

| | | |
|---|---|---|
| [72] | Inventor | Gene R. Feaster<br>Horseheads, N.Y. |
| [21] | Appl. No. | 771,705 |
| [22] | Filed | Oct. 30, 1968 |
| [45] | Patented | Jan. 5, 1971 |
| [73] | Assignee | Westinghouse Electric Corporation<br>Pittsburgh, Pa.<br>a corporation of Pennsylvania |

[54] ELECTRONIC IMAGE DEVICE WITH PROTECTIVE CIRCUIT
1 Claim, 2 Drawing Figs.

[52] U.S. Cl. .................................................... 315/11,
317/3; 328/10
[51] Int. Cl. ..................................................... H01j 31/48
[50] Field of Search ........................................... 317/31;
328/10; 315/11, 12

[56] References Cited
UNITED STATES PATENTS

| | | | |
|---|---|---|---|
| 2,083,205 | 6/1937 | Schlesinger .................. | 328/10X |
| 2,678,391 | 5/1954 | Lappin ......................... | 328/10X |
| 3,373,291 | 3/1968 | Peterson et al. .............. | 317/31 |

OTHER REFERENCES
Electronic Design, February 19, 1958

*Primary Examiner*—Rodney D. Bennett, Jr.
*Assistant Examiner*—Joseph G. Baxter
*Attorneys*—F. H. Henson and C. F. Renz ABSTRACT: An electronic image system including a tube incorporating relatively thin electrode members is subject to damage by acquiring a high potential by friction induced static electricity with respect to other electronic tube elements. A permanent protective circuit is provided for such a damage susceptible electrode to protect the electrode from possible ambient contact with high voltages while still permitting the tube to function under normal operating voltages.

PATENTED JAN 5 1971

3,553,522

INVENTOR
Gene R. Feaster
BY C. K. Renz
ATTORNEY

ELECTRONIC IMAGE DEVICE WITH PROTECTIVE CIRCUIT

BACKGROUND OF THE INVENTION

1. Field of the Invention

The present invention relates to an electron image device incorporating a large area electrode number. The electrode may be susceptible to ambient charging resulting in destruction of the electrode due to electrostatic attraction with other electrodes. More particularly, this invention is directed to a protective circuit associated with such an electrode to prevent the buildup of a high voltage on the electrode while still permitting the normal operation of the electronic tube without decoupling the protective circuit.

2. Description of the Prior Art

This invention is directed to protection of large area electrodes within electronic image tubes from high voltage static electricity. One particular application of this invention is the protection of the storage electrode in a secondary electron conduction camera tube such as Westinghouse tube type WL-30691 and generally described in U.S. Pat. No. 3,213,316 issued Oct. 19, 1965 by G. W. Goetze et al. This secondary electron conduction camera tube includes a target member which consists of a supporting member of aluminum oxide approximately 500 Angstrom units in thickness and a signal electrode layer of aluminum of a thickness of about 500 Angstrom units. In addition a highly porous layer of a suitable material such as potassium chloride is provided on the aluminum layer. The potassium chloride layer has a thickness of about 20 times the thickness of the sum of the other two layers but is of a density of about 10 percent of the normal bulk density. This thin film target is susceptible to damage in the event that an excessive charge should be established on the surface of the target. A suppressor mesh is closely spaced, about .010 inch, to the potassium chloride layer surface of the target and any high potential applied to one of these electrodes can cause the two to contact resulting in permanent damage to the target. The tube is subject to such damage in that a person or an object which has acquired a high potential by friction induced static electricity may, on coming in contact with the target lead of the tube, pass electric charge to the target thereby raising it to a high potential with respect to other tube elements especially the closely spaced suppressor mesh. The resulting coulomb forces (electrostatic attraction) can mechanically distort the target past its elastic limit resulting in breakage. Damage can also result from the same mechanism if the static charge is applied to the suppressor mesh electrode. If the electric charge is not great enough to actually shatter the target, it may cause a spark to pass between the target and the suppressor mesh which can perforate the target or damage the potassium chloride coating. This causes a permanent blemish to appear in the picture obtained from the tube.

The customary method of protecting against a potential buildup and possible resultant damage is to provide a removable metal lead or wire connection between the target and the suppressor mesh. This provides an electrical short external to the tube envelope. This shorting feature should remain on the tube from the time of manufacture until the tube is scrapped. However, during the time when the tube is installed in a camera head, the short must be opened. Even momentary open circuit conditions can give opportunity for destructive static discharge from the operator to one of the sensitive electrodes. The attempt to observe rigid protective procedures in handling the tube in this manner is a problem both for the manufacture and the user.

SUMMARY OF THE INVENTION

This invention overcomes the difficulties in the prior art in providing a surge arrester or overvoltage protector to prevent damage arising from the mechanism described in the discussion of the prior art. The possible utilization of capacitor or resistor would prevent the destructive potential rise but interferes with the proper electrical functioning of the tube. By providing an overvoltage protector, such as a neon glow discharge tube, in shunt with the target and suppressor, this invention provides a permanent protective circuit without interfering with the normal operation of the tube.

BRIEF DESCRIPTION OF THE DRAWINGS

For a better understanding of the invention, reference may be had to the accompanying drawings, in which.

DESCRIPTION OF THE PREFERRED EMBODIMENTS

Figure 1:
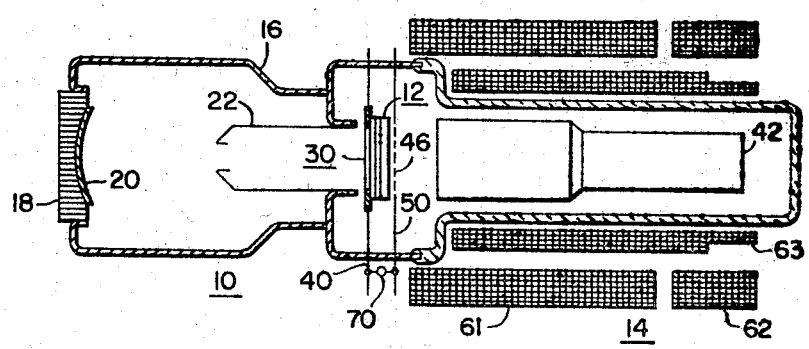
FIG. 1 is an elevational view in section, schematically representing a secondary electron conduction camera tube in accordance with the teachings of this invention.

Referring to FIG. 1 there is illustrated a secondary electron conduction camera tube which consists of an electrostatically focused diode image section 10, a target assembly 12 and a magnetically focused and deflecting reading section 14. The tube consists of an evacuated envelope 16. The image section 10 includes an input window 18 which may be of fiber optics having a photocathode 20 provided on the inner surface of the faceplate 18. The photocathode 20 may be of any suitable material responsive to input radiations directed through the transmissive faceplate 18. The photocathode 20 generated photoelectrons from the illuminated areas of the image in direct proportion to the amount of incident radiation passing through the faceplate 18.

Photoelectrons generated by the photocathode 20 are accelerated toward the target assembly 12 where they are brought to focus by an electrostatic lens formed between the photocathode surface 20 and an anode cone 22. The electron image from the photocathode 20 is transferred to the target assembly 12 of a reduced size.

The target assembly 12 is comprised of a target member 30. The target member 30, which is shown more in detail in FIG. 2, consists of a supporting membrance of aluminum oxide 32 which is supported on a Kovar ring 34 and is of a thickness of about 500 Angstrom units. A layer of about 500 Angstrom units of aluminum 36 which forms the signal electrode of the target is provided on the surface of the support layer 32. A highly porous layer 38 of a suitable material exhibiting the property of secondary electron conduction such as potassium chloride is provided on the aluminum layer 36 and faces the reading section 14. The layer 38 is deposited so as to provide a density of less than 10 percent of the bulk density of the potassium chloride and to thickness of about 20,000 Angstrom units. An electrical lead-in 40 is provided from the exterior of the envelope to the signal electrode 36.

An electron gun 42 is provided for generating an electron beam for scanning a raster over the target member 30. A positive potential of about 20 volts is applied by means of the lead-in 40 by suitable potential source 44 to the signal plate 36. The exposed surface of the porous layer 38 is stabilized to a potential of approximately ground by means of the low velocity scanning beam generated by the electron gun 42. In this manner an electric field is established across the layer 38.

Positioned between the target 30 and the electron gun 42 is a suppressor mesh 46 which is a conductive material having about $10^6$ openings per square inch and a thickness of about one-half mil and spaced from the target member by about .010 inch. The suppressor mesh 46 is also provided with a lead-in 50 to the exterior of the envelope and is connected to a suitable potential source 52 of a potential of about 15 volts. The photoelectrons from the photocathode 20 penetrate the aluminum oxide layer 32 and the aluminum layer 36 and dissipate most of their energy within the layer 38 thereby generating secondary electrons. Under the influence of the internal electric field, the secondary electrons migrate through the porous structure of the layer 38 to the signal plate 36. The conduction takes place in the vacuum and not in the conduction bank of the layer 38, thus avoiding the persistence effect caused by trapping and subsequent release of charge carriers by the shallow trapping centers. The movement of the electrons within the layer 38 creates a positive charge pattern on the exposed surface of the layer 38 corresponding to the input image. The charge image thus established on the layer 38 is periodically read out by the electron gun 42 which returns the exposed surface to gun cathode potential by depositing electrons on the positively charged areas. Thus current pulse, constituting the video signal, is capacitively coupled to the signal plate 36. The current flowing in the signal plate 36 is used to develop a voltage across the load resistor which, after amplification, can be utilized to produce a video picture on a television monitor in the usual manner. The alignment and deflection of the electron beam generated by the electron gun 42 is accomplished by a transverse magnetic field produced by external coils 61, 62 and 63.

Figure 2:
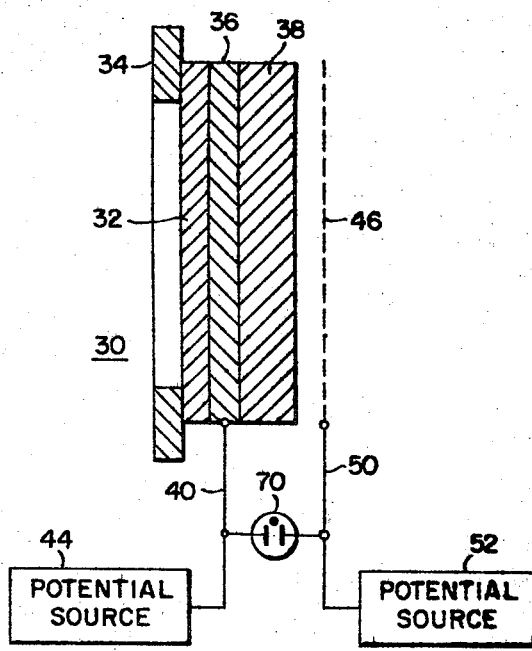
FIG. 2 is an enlarged sectional view of a portion of FIG. 1.

As illustrated in FIGS. 1 and 2, a bilateral conductive device 70 which goes from high resistance device to low resistance device at a given threshold value, is connected between the lead-in members 40 and 50 to thereby shunt the target 30 and the suppressor mesh 46. In the specific embodiment, a neon bulb NE2E was used for the device 70. At potentials below 60 volts, no discharge forms in the lamp 70 and the device is inactive or inert. With no discharge, the lamp 70 offers merely a shunt capacitance of about 1 picofarad and a shunt resistance of over 100 megohms. The 60 volt threshold is well above any bias voltage that would be applied between the target 30 and the suppressor mesh 46 in the operation previously described and consequently the permanently attached lamp 70 does not interfere with the proper electronic function of the tube and its associated electronic circuitry. If at any time the potential difference between the suppressor mesh 46 and the target 30 exceeds 60 to 90 volts, the lamp 70 fires permitting the transfer of charge from one electrode to the other until the potential difference drops below a level which will support the discharge and the lamp 70 goes out. The actual amount of charge that must be transferred is quite small. The reason such small charges can create such high potentials is because of the low capacitance between the surfaces of the electrodes 30 and 46.

In addition to a neon lamp any similar device such as precision spark gaps or solid state devices such as pairs of Zener diodes in a back-to-back configuration may be utilized as a substitute for the neon lamp 70. The protective device 70 may be located internally within the envelope or externally as illustrated herein. If provided internally, it is necessary that it be able to withstand the bake-out temperature of the envelope.

Since numerous changes may be made in the above-described apparatus and different embodiments of the invention may be made without departing from the spirit thereof, it is intended that all matter contained in the foregoing description or shown in the accompanying drawings, shall be interpreted as illustrative and not in a limiting sense.

I claim:
1. An electron imaging device comprising a first electrode comprising a target member of porous material supported by a thin film and exhibiting the property of secondary electron conduction, said electrode susceptible to electrostatic charging and positioned within a secondary electron conduction camera tube, a second electrode positioned within said tube closely spaced to said first electrode and capacitively coupled thereto, a first terminal means on said electronic tube for applying potential to said first electrode, a second terminal means on said electronic tube for applying potential to said second electrode and a neon lamp mounted and secured to said electronic tube and permanently connected between said first and second terminals and said neon lamp exhibiting the property of a high resistance at and below the normal operating potentials of said electrodes and a low resistance to selected potentials above said normal operating potentials to provide protection of said first electrode from damage from build up of high electric fields between said first and second electrodes due to electrostatic charging both during shipment of said tube and installation in an electronic system.